(12) United States Patent
Nobuta et al.

(10) Patent No.: US 10,629,383 B2
(45) Date of Patent: Apr. 21, 2020

(54) SOLID ELECTROLYTIC CAPACITOR

(71) Applicant: Murata Manufacturing Co., Ltd., Nagaokakyo-shi, Kyoto-fu (JP)

(72) Inventors: Tomoki Nobuta, Nagaokakyo (JP); Kazumasa Fujimoto, Nagaokakyo (JP); Osamu Yokokura, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/472,826

(22) Filed: Mar. 29, 2017

(65) Prior Publication Data
US 2017/0287647 A1 Oct. 5, 2017

(30) Foreign Application Priority Data

Mar. 31, 2016 (JP) ................... 2016-069888

(51) Int. Cl.
| | |
|---|---|
| H01G 9/15 | (2006.01) |
| H01G 9/048 | (2006.01) |
| H01G 9/14 | (2006.01) |
| H01G 9/012 | (2006.01) |
| H01G 9/055 | (2006.01) |
| H01G 9/26 | (2006.01) |
| H01G 9/10 | (2006.01) |
| H01G 9/042 | (2006.01) |
| H01G 9/07 | (2006.01) |

(52) U.S. Cl.
CPC ............. *H01G 9/048* (2013.01); *H01G 9/012* (2013.01); *H01G 9/042* (2013.01); *H01G 9/055* (2013.01); *H01G 9/07* (2013.01); *H01G 9/10* (2013.01); *H01G 9/14* (2013.01); *H01G 9/15* (2013.01); *H01G 9/26* (2013.01); *H01G 9/0425* (2013.01)

(58) Field of Classification Search
CPC .......... H01G 9/048; H01G 9/042; H01G 9/07; H01G 9/15
See application file for complete search history.

(56) References Cited

U.S. PATENT DOCUMENTS

| | | | | |
|---|---|---|---|---|
| 5,184,287 A | * | 2/1993 | Taniguchi | .............. H01G 9/012 361/540 |
| 6,381,117 B1 | * | 4/2002 | Nakagawa | .............. H01G 2/14 361/301.4 |
| 7,385,804 B2 | | 6/2008 | Kuriyama | |

(Continued)

FOREIGN PATENT DOCUMENTS

| | | |
|---|---|---|
| JP | S5684342 U | 7/1981 |
| JP | H06196373 A | 7/1994 |

(Continued)

*Primary Examiner* — Dion Ferguson
(74) *Attorney, Agent, or Firm* — Arent Fox LLP (57) ABSTRACT

A solid electrolytic capacitor that includes a capacitor element having a linear through conductor made of a valve function metal, a dielectric layer disposed on the through conductor, and a cathode-side functional layer disposed on the dielectric layer. The through conductor includes a core portion and a porous portion covering a peripheral surface of the core portion. Both end faces of the core portion of the through conductor are in contact with a pair of anode terminals on the pair of end faces of the body, respectively. A cathode terminal is electrically connected to the cathode-side functional layer.

15 Claims, 7 Drawing Sheets

(56) References Cited

U.S. PATENT DOCUMENTS

| | | | |
|---|---|---|---|
| 7,550,360 B2* | 6/2009 | Yoshida | H01G 9/012 257/E21.517 |
| 7,929,275 B2 | 4/2011 | Kuriyama | |
| 9,007,743 B2 | 4/2015 | Kawai et al. | |
| 9,576,740 B2* | 2/2017 | Shin | H01G 9/008 |
| 2003/0223180 A1* | 12/2003 | Aoyama | H01G 2/065 361/523 |
| 2004/0047112 A1* | 3/2004 | Yoshida | H01G 9/012 361/523 |
| 2005/0013093 A1* | 1/2005 | Nagasawa | H01G 9/15 361/508 |
| 2005/0195553 A1* | 9/2005 | Goldberger | H01G 9/012 361/300 |
| 2005/0207090 A1* | 9/2005 | Kuriyama | H01G 9/012 361/271 |
| 2006/0164189 A1 | 7/2006 | Tohya et al. | |
| 2006/0262490 A1* | 11/2006 | Saitou | H01G 9/012 361/540 |
| 2006/0285276 A1 | 12/2006 | Kuriyama | |
| 2007/0188980 A1* | 8/2007 | Hossick-Schott | H01G 9/042 361/517 |
| 2008/0094780 A1* | 4/2008 | Kuriyama | H01G 2/22 361/523 |
| 2008/0218944 A1 | 9/2008 | Kuriyama | |
| 2008/0291606 A1* | 11/2008 | Takahashi | H01G 9/08 361/535 |
| 2010/0165547 A1* | 7/2010 | Kuranuki | H01G 9/012 361/525 |
| 2012/0262647 A1 | 10/2012 | Hu et al. | |

FOREIGN PATENT DOCUMENTS

| | | |
|---|---|---|
| JP | H06-349688 A | 12/1994 |
| JP | 2003086459 A | 3/2003 |
| JP | 2003-197471 A | 7/2003 |
| JP | 2008177198 A | 7/2006 |
| JP | 2008021774 A | 1/2008 |
| JP | 2011-96746 A | 5/2011 |
| JP | 2012231120 A | 11/2012 |
| WO | WO 2004/023597 A1 | 3/2004 |
| WO | WO 2005015588 A | 2/2005 |

* cited by examiner

SOLID ELECTROLYTIC CAPACITOR

CROSS REFERENCE TO RELATED APPLICATIONS

The present application claims priority to Japanese Patent Application No. 2016-069888, filed Mar. 31, 2016, the entire contents of which is incorporated herein by reference.

BACKGROUND OF THE INVENTION

1. Field of the Invention

The present invention relates to a solid electrolytic capacitor, and particularly relates to a three-terminal solid electrolytic capacitor configured to supply electrical power via a through conductor made of a valve function metal.

2. Description of the Related Art

A solid electrolytic capacitor is not only used as a typical capacitor in a decoupling circuit or a power circuit, but also advantageously used as a noise filter for removing high-frequency noise.

For example, WO 2005/015588 A discloses an interesting conventional technology to the present invention. In particular, a solid electrolytic capacitor illustrated in FIGS. 10 and 11 of WO 2005/015588 A is relevant. The following describes this solid electrolytic capacitor with reference to FIG. 8 herein.

Figure 8:
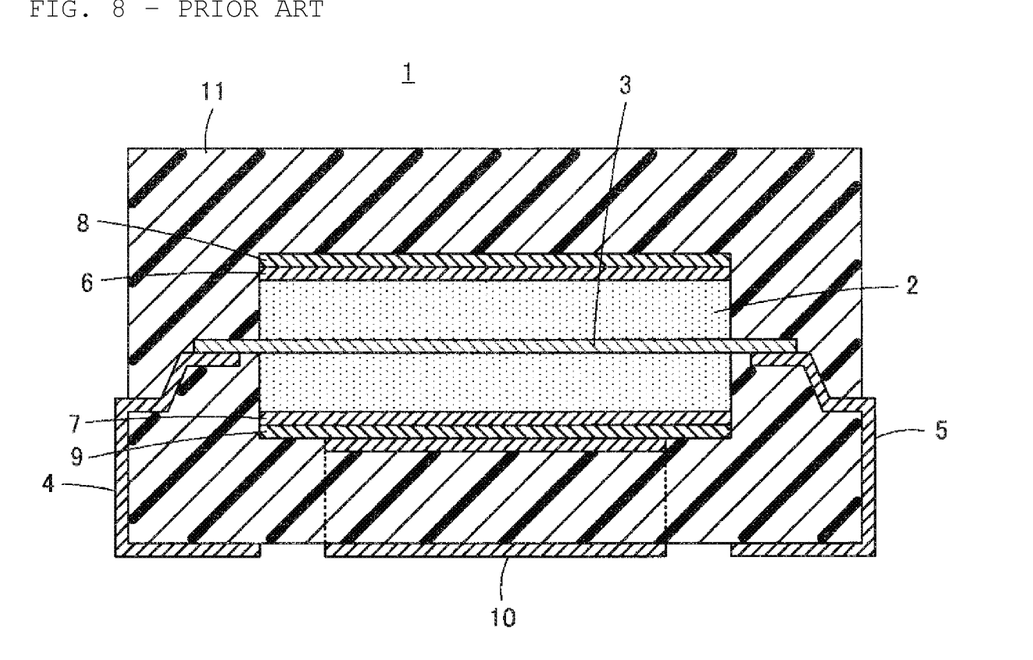
FIG. 8 is a transverse sectional view taken along a central line in a plan view illustrating a solid electrolytic capacitor 1 disclosed in WO 2005/015588 A.

As illustrated in FIG. 8, a solid electrolytic capacitor 1 includes a porous sintered body 2 made of metal grains or conductive ceramic grains and having a valve function, and an anode wire 3 provided to penetrate through the porous sintered body 2 and having both ends protruding from the porous sintered body 2. Both ends of the anode wire 3, protruding from the porous sintered body 2 are electrically connected with respective anode terminals 4 and 5 each made of a metal plate bent to have a substantially C-shaped section.

Conductive resin 6 and 7 as cathodes are disposed on upper and lower surfaces of the porous sintered body 2, respectively, and in addition, cathode plates 8 and 9 as metal plates are bonded to the surfaces with the conductive resin 6 and 7 interposed therebetween, respectively. Although not illustrated, the upper cathode plate 8 and the lower cathode plate 9 are electrically connected with each other through a conductive member disposed alongside surfaces of the porous sintered body 2. The cathode plate 9 disposed below the porous sintered body 2 is connected with a cathode terminal 10.

The cathode terminal 10 is made of a metal plate bent to have a U-shaped section.

The porous sintered body 2 is covered by sealing resin 11. The anode terminals 4 and 5 and the cathode terminal 10 described above are each partially exposed from the sealing resin 11 to enable electric connection with an external mounting substrate.

The solid electrolytic capacitor 1 is used to supply electrical power from one of the anode terminals 4 and 5 to the other while removing noise. Current input to the solid electrolytic capacitor 1 mostly passes through the anode wire 3, which leads to reduction of electric loss in the solid electrolytic capacitor 1. Since small current flows inside the porous sintered body 2, heat generation in the porous sintered body 2 can be reduced.

SUMMARY OF THE INVENTION

However, the above-described solid electrolytic capacitor 1 has a problem to be solved as described below.

Figure 9:
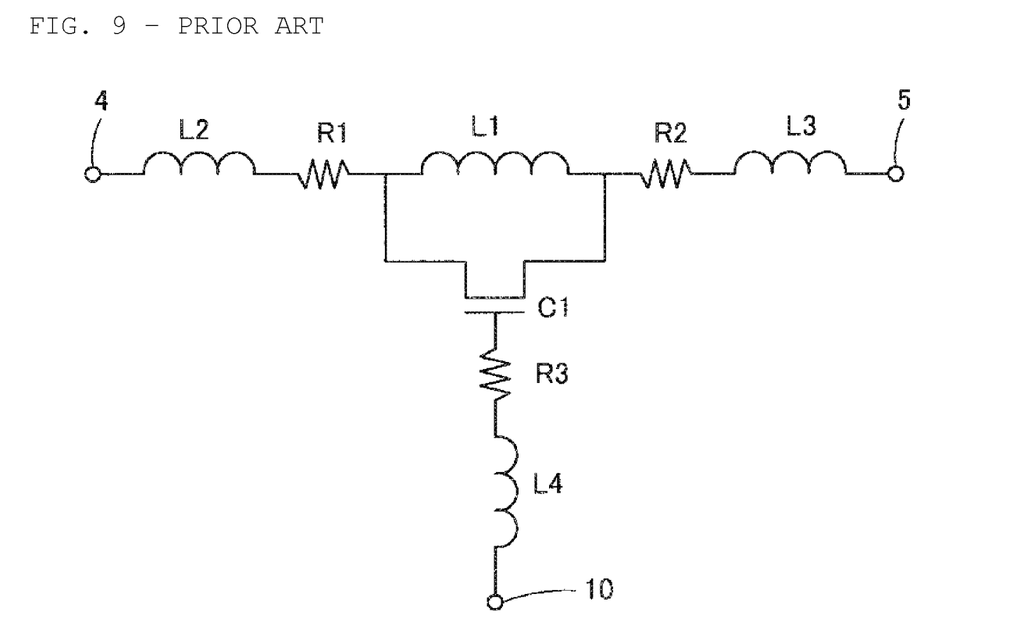
FIG. 9 is an equivalent circuit diagram of the solid electrolytic capacitor 1 illustrated in FIG. 8.

FIG. 9 is an equivalent circuit diagram provided by the solid electrolytic capacitor 1.

In FIG. 8 as well as FIG. 9, capacitance C1 is formed between the anode wire 3 and the cathode plates 8 and 9, and resistance R3 and inductance L4 are resistance and parasitic inductance, respectively, on a conductive path from the cathode plates 8 and 9 to a mounting part of the cathode terminal 10. Inductance L1 is parasitic inductance generated mainly by the anode wire 3. Resistance R1 and inductance L2 are resistance and parasitic inductance, respectively, on a conductive path from one end of the anode wire 3 to a mounting part of the anode terminal 4. Resistance R2 and inductance L3 are resistance and parasitic inductance, respectively, on a conductive path from the other end of the anode wire 3 to a mounting part of the anode terminal 5.

In the solid electrolytic capacitor 1 expressed in such an equivalent circuit diagram, first, parasitic inductances L2 and L3 become large. This is because, the conductive path extending from the one end of the anode wire 3 to the mounting part of the anode terminal 4 and the conductive path extending from the other end of the anode wire 3 to the mounting part of the anode terminal 5 are relatively long, and the anode terminals 4 and 5 do not extend straight, but includes several bent parts.

As described above, when parasitic inductances L2 and L3 become large, noise removal performance of the solid electrolytic capacitor 1 degrades at high frequency band.

Simultaneously, resistances R1 and R2 become relatively large. This is because, as described above, the conductive path from the one end of the anode wire 3 to the mounting part of the anode terminal 4 and the conductive path from the other end of the anode wire 3 to the mounting part of the anode terminal 5 are relatively long, and also because a connection part between the one end of the anode wire 3 and the anode terminal 4 and a connection part between the other end of the anode wire 3 and the anode terminal 5 are based on linear contact between a peripheral surface part of the cylindrical anode wire 3 and plane parts of the anode terminals 4 and 5.

Large resistances R1 and R2 as described above result in reduced current allowed to flow through the solid electrolytic capacitor 1.

Components such as the anode terminals 4 and 5, which do not contribute to capacitance formation in the solid electrolytic capacitor 1, occupy a relatively large fraction of the entire volume, leading to a low volumetric efficiency. Accordingly, it is difficult to achieve size reduction and large capacitance.

The present invention is thus intended to provide a solid electrolytic capacitor that solves the above-described problem.

To solve the above-described technical problem, a solid electrolytic capacitor according to the present invention includes a capacitor element having a linear through conductor made of a valve function metal, a dielectric layer disposed on the through conductor, and a cathode-side functional layer disposed on the dielectric layer.

The through conductor includes a core portion extending in an axial direction of the through conductor and a pair of end faces facing each other, and a porous portion covering a peripheral surface of the core portion and including a large number of fine pores. The dielectric layer is formed along an inner peripheral surface of each fine pore of the porous portion.

Both end faces of the core portion of the through conductor are exposed from a sealing member, and in contact with a pair of anode terminals on the pair of end faces of the core portion, respectively.

In this manner, the pair of anode terminals are disposed on the pair of end faces of the core portion of the through conductor and thus the lengths of conductive paths near the anode terminals can be shorten.

In the present invention, the above-described cathode-side functional layer preferably includes, as a solid electrolyte, a conductive polymer layer filling at least part of the fine pores of the porous portion. With this configuration, the conductive polymer layer as the cathode-side functional layer and the dielectric layer can be in contact with each other on a large area.

The present invention preferably further includes an electric insulating member disposed between the cathode-side functional layer and each of the anode terminals. With this configuration, electric insulation can be highly reliably achieved between the cathode-side functional layer and the anode terminals.

The above-described electric insulating member is more preferably in contact with the core portion. This configuration can reduce occurrences where plating solution penetrates into the porous portion and remains therein when, for example, wet plating is applied to form the anode terminals. At a part where the electric insulating member is in contact with the core portion in the above-described configuration, the electric insulating member fills the fine pores of the porous portion, or the porous portion does not exist.

The peripheral surface of the core portion is covered by the porous portion in the through conductor, but in particular, the through conductor preferably has a cylindrical shape. This cylindrical shape includes an elliptic cylindrical shape, a flat column shape, and a rectangular column with rounded edge parts. The cylindrical through conductor has no finely defined corners on the peripheral surface thereof. Thus, the conductive polymer layer, which is excellent for formation of the cathode-side functional layer, can reduce undesired contact between an anode-side component and a cathode-side component disposed with the cathode-side functional layer interposed therebetween.

If the peripheral surface includes a defined corner, for example, part of the defined corner cannot be covered and the through conductor is exposed, so that a defect of the capacitor is likely to occur. Even when the defined corner is covered, the porous portion is likely to have poor uniformity with a smaller thickness at the corner part and a larger thickness at a flat part, which thickens the capacitor element, and makes it difficult to achieve reduction in the height of the capacitor. Thus, excellent formability of the cathode-side functional layer leads to excellent uniformity of the thickness of each component included in the cathode-side functional layer. For this reason, the through conductor preferably includes no defined corner on the peripheral surface thereof. The defined corner means a non-rounded part with an acute or blunt angle.

At shaping of the sealing member containing resin, since the through conductor is cylindrical, external stress applied to the through conductor is advantageously distributed. Thus, damage on the through conductor at the shaping of the sealing member can be advantageously avoided.

In addition, since the through conductor is cylindrical, the sealing member has an excellent filling characteristic. Thus, a high package effect is achieved by the sealing member, and accordingly, the solid electrolytic capacitor can provide high water and air shielding performance and excellent moisture and thermal resistance.

The entire circumferential surface of the cylindrical through conductor can be used as a capacitance developing part, and thus the capacitance developing part can have an area approximately 1.5 times as large as that in a case of metal foil such as aluminum foil.

The anode terminals each preferably include a plated film, a conductive resin film, or both.

The porous portion is preferably an etched portion formed on a peripheral surface of the linear through conductor. Specifically, the through conductor can be obtained by etching the surface of a metal wire to leave the core portion. This configuration allows optional and easy adjustment of a cross-sectional area ratio of the core portion as an anode while maintaining conduction between the core portion and the porous portion. The magnitude of capacitance and the degree of contact with the anode terminals can be adjusted by adjusting the ratio (cross-sectional area ratio) of the core portion relative to the sum of the core portion and the porous portion in a cross-sectional area. For example, when this ratio is large, a contact area between the anode terminals and the core portion is large. In other words, the resistance is low at the electrically connected part, which is advantageous for achieving large current flow, for example. In addition, a larger close contact area can be provided between the core portion and the plated film, which is advantageous for long-term durability, for example. These are merely exemplary, and it is preferable to optionally adjust the cross-sectional area ratio of the core portion for use in accordance with various requirements.

In the case of the porous sintered body as disclosed in WO 2005/015588 A, however, a grain-grain and grain-wire necking technology is necessary to achieve conduction between a sintered part and a wire, which complicates the process of manufacturing.

In the solid electrolytic capacitor according to the present invention, the body preferably includes a plurality of the capacitor elements to achieve a lower equivalent series resistance (ESR) and a larger capacitance. In this case, the plurality of capacitor elements are connected in parallel with each other through the anode terminals and the cathode terminals thereof.

The cathode terminal is preferably a metal plate. The metal plate has an excellent heat radiation property as compared to a printed substrate and a resin plate. Unlike the printed substrate, the metal plate does not require formation of a through-hole conductor or a via conductor for wiring the capacitor element and a mounting-side terminal, but provides conductive paths on the entire surface thereof, thereby achieving shorter conductive paths.

In addition, the metal plate has excellent strength even with a small thickness, which is advantageous for reduction in the height of the solid electrolytic capacitor. Moreover, the metal plate is inexpensive as compared to the printed substrate, which is advantageous for reduction in cost of the solid electrolytic capacitor.

According to the present invention, because the lengths of conductive paths near the anode terminals can be shortened, parasitic inductances generated on the conductive paths near the anode terminals can be reduced, thereby improving noise removal performance of a solid electrolytic capacitor in a high frequency band.

As described above, according to the present invention, since both end faces of the core portion of the through conductor are in contact with the pair of anode terminals, respectively, this contact can be planar contact on relatively large areas. This configuration can maintain, at a low value, resistance at electrically connected parts between the core portion of the through conductor and the anode terminals. Accordingly, large current is allowed to flow through the solid electrolytic capacitor.

According to the present invention, the anode terminals, which do not contribute to capacitance formation, are disposed on the end faces of the core portion of the through conductor are directly in contact with the anode terminals, and thus a member which does not contribute to capacitance formation occupies a relatively small fraction of the entire volume, leading to high a volumetric efficiency. This configuration is thus suitable for achieving size reduction and large capacitance. The noise removal performance can be increased in a frequency band attributable to capacitance. Thus, according to the present invention, the noise removal performance can be increased in a wide frequency band including a high frequency band attributable to parasitic inductance and a frequency band attributable to capacitance.

According to the present invention, the functionalities of the two components of the porous sintered body 2 and the anode wire 3 in the solid electrolytic capacitor 1 disclosed in WO 2005/015588 A and illustrated in FIG. 8 can be achieved by the single component of the through conductor including the core portion and the porous portion, thereby achieving reduction in the number of components and thus in cost.

DETAILED DESCRIPTION OF THE INVENTION

The following describes a solid electrolytic capacitor 21 according to a first embodiment of the present invention with reference to FIGS. 1 to 5.

Figure 1:
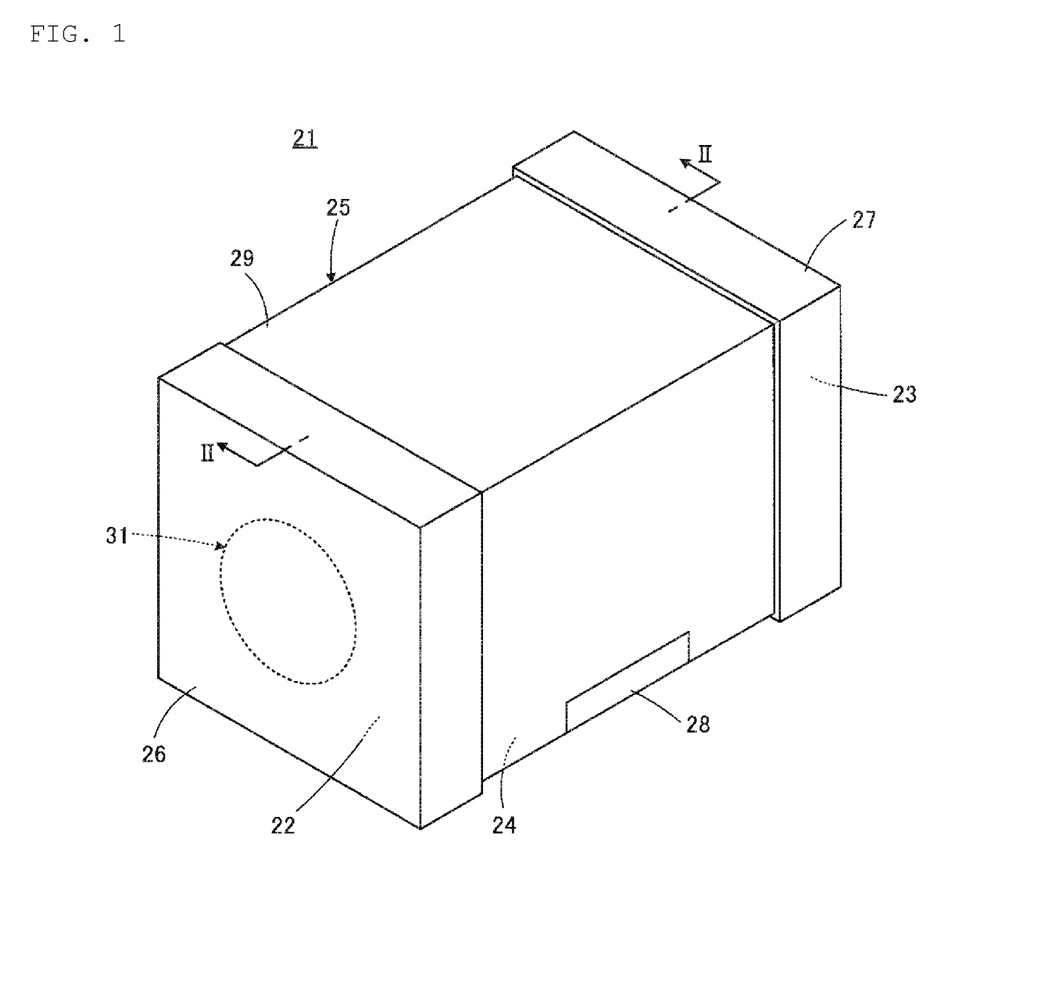
FIG. 1 is a perspective view illustrating appearance of a solid electrolytic capacitor 21 according to a first embodiment of the present invention.
Figure 2:
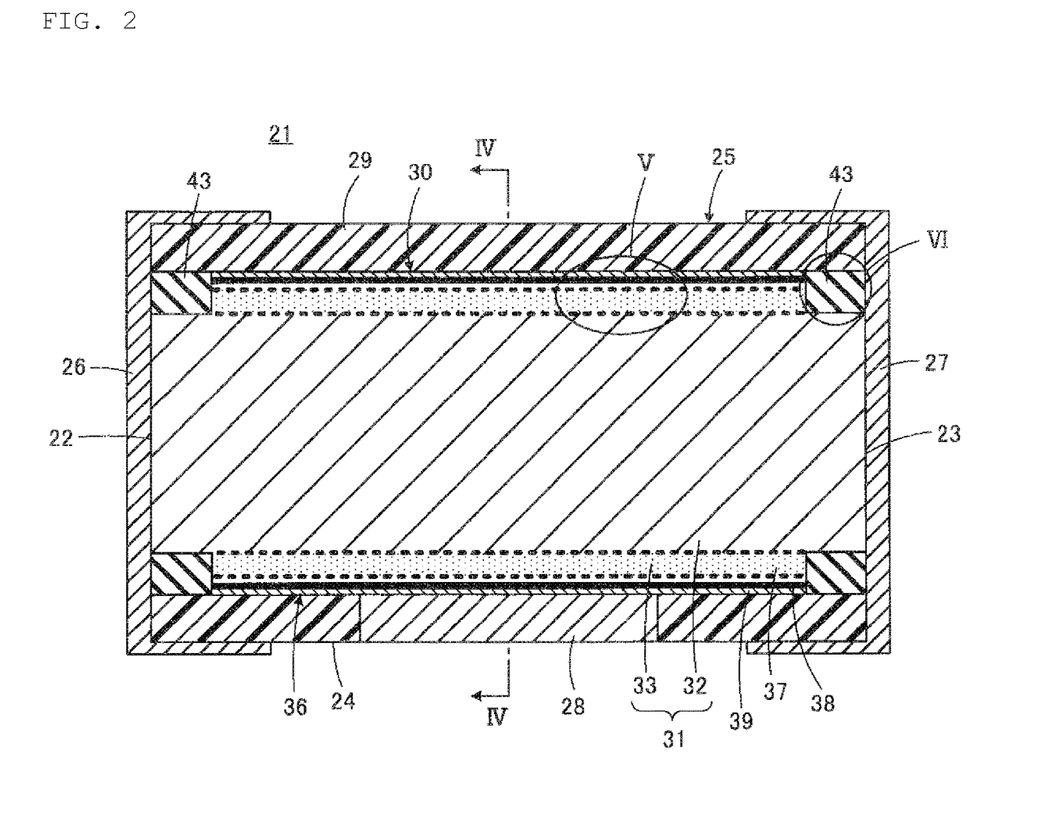
FIG. 2 is a cross-sectional view taken along line II-II illustrated in FIG. 1.
Figure 3:
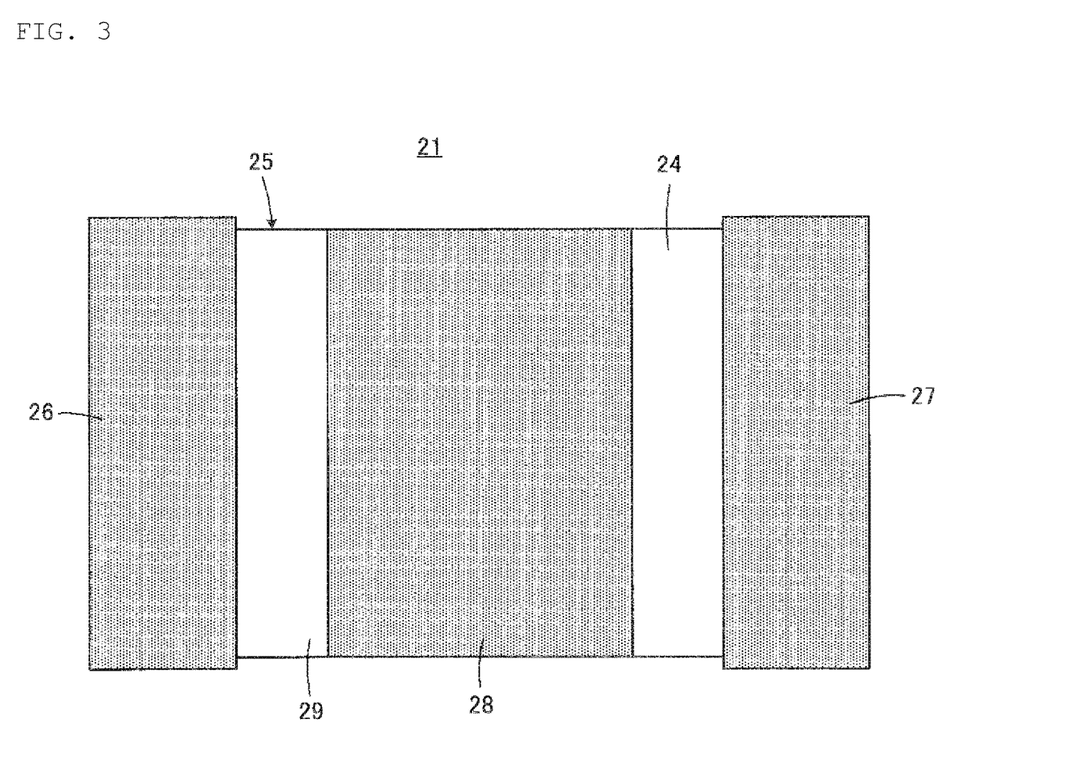
FIG. 3 is a bottom view of the solid electrolytic capacitor 21 illustrated in FIG. 1.

The solid electrolytic capacitor 21 includes a rectangular parallelepiped body 25 including a pair of end faces 22 and 23 facing to each other and a bottom surface 24 adjacent to the end faces 22 and 23, a pair of anode terminals 26 and 27 disposed on the pair of end faces 22 and 23 of the body 25, respectively, and a cathode terminal 28 disposed on the bottom surface 24 of the body 25.

The body 25 includes a sealing member 29 containing resin, and a capacitor element 30 covered by the sealing member 29.

The capacitor element 30 includes a linear through conductor 31 made of a valve function metal. The valve function metal, of which the through conductor 31 is made, is, for example, aluminum, tantalum, niobium, titanium, or an alloy containing at least one of these materials. The through conductor 31 has a cylindrical shape in the present embodiment. The through conductor 31 is preferably an aluminum wire, which is inexpensive and easily available.

Figure 4:
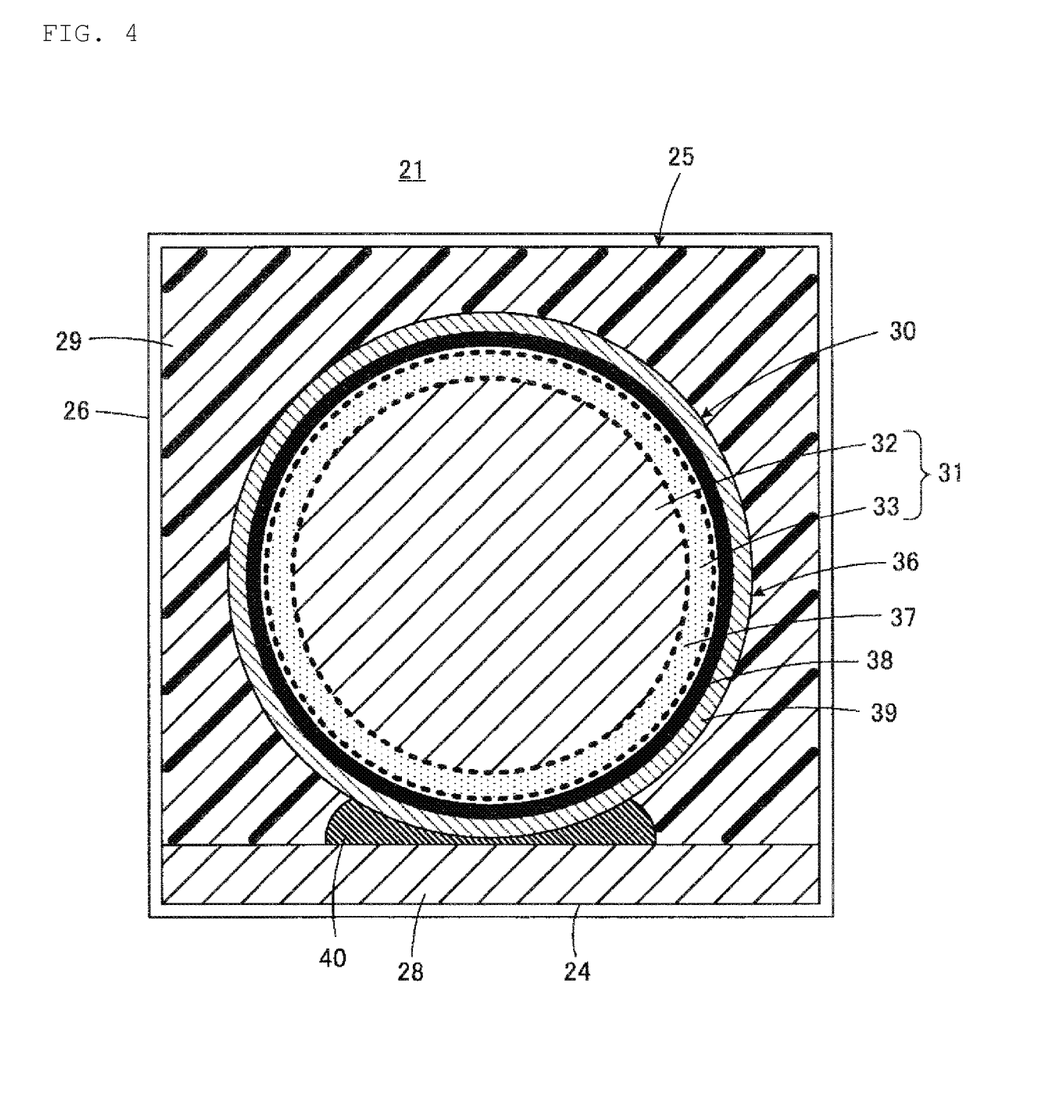
FIG. 4 is a cross-sectional view taken along line IV-IV illustrated in FIG. 2.
Figure 5:
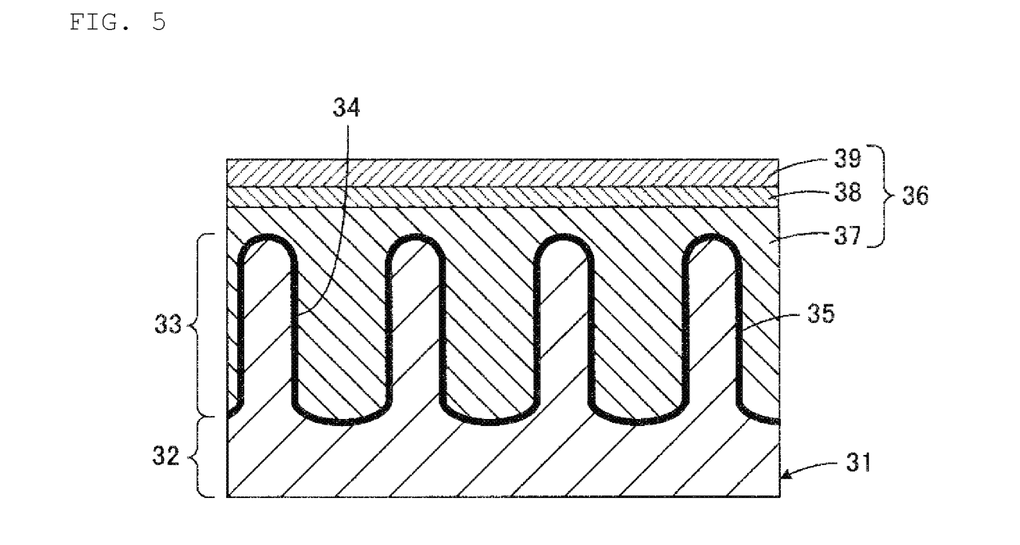
FIG. 5 is an enlarged cross-sectional view schematically illustrating part V illustrated in FIG. 2.

The through conductor 31 includes a core portion 32 extending in an axial direction of the through conductor 31, and a porous portion 33 covering a peripheral surface of the core portion 32 and including a large number of fine pores. The porous portion 33 is formed by, for example, providing etching processing on a peripheral surface of the through conductor 31 made of an aluminum wire to rough the peripheral surface. As schematically illustrated in FIG. 5, the porous portion 33 is provided with a large number of fine pores 34 each including an externally facing opening. In FIGS. 2 and 4, the porous portion 33 is illustrated as a hatched region sandwiched by a thick dotted line.

As illustrated in FIG. 5, the capacitor element 30 includes a dielectric layer 35 disposed on the through conductor 31. The dielectric layer 35 is formed by, for example, oxidizing a surface of the through conductor 31 in which the porous portion 33 is formed. In FIG. 5, the dielectric layer 35 is illustrated with a bold line. The dielectric layer 35 is formed along the inner peripheral surface of each fine pore 34 of the porous portion 33.

The capacitor element 30 further includes a cathode-side functional layer 36 disposed on the dielectric layer 35. The cathode-side functional layer 36 includes a conductive polymer layer 37 as solid electrolyte, a carbon layer 38 disposed on the conductive polymer layer 37, and a silver layer 39 disposed on the carbon layer 38. As illustrated in FIG. 5, the conductive polymer layer 37 is provided to fill at least part of the fine pores 34 of the porous portion 33. Accordingly, the conductive polymer layer 37 and the dielectric layer 35 can be in contact with each other at a large area. The carbon layer 38 and the silver layer 39 of the cathode-side functional layer 36 function as a cathode layer of the capacitor element 30. In other words, the cathode-side functional layer 36 includes the conductive polymer layer 37, and the cathode layer disposed on the conductive polymer layer 37. The cathode layer may be any conductive layer. The cathode layer shown in FIG. 5 includes a plurality of layers (i.e., the carbon layer 38 and the silver layer 39 in the present embodiment), but may include the silver layer 39 only.

The cathode-side functional layer 36, more specifically, the silver layer 39 is electrically connected with the cathode terminal 28 through, for example, a conductive adhesive agent 40 (refer to FIG. 4). The cathode terminal 28 is a metal plate.

Both end faces of the core portion 32 of the through conductor 31 are exposed from the sealing member 29 and in contact with the pair of anode terminals 26 and 27 on the pair of end faces 22 and 23 of the body 25, respectively. As illustrated in FIG. 2, the anode terminals 26 and 27 are each a plated film or conductive resin film formed on the end faces of the core portion 32 of the through conductor 31, the plated film containing a metal such as nickel, zinc, copper, tin, gold, silver, palladium, or lead, or an alloy containing at least one of these metals, and the conductive resin film containing, as a conductive component, at least one of silver, copper, nickel, tin, and palladium. Alternatively, the anode terminals 26 and 27 may each have a multi-layer structure including the plated film and the conductive resin film. For example, the anode terminals 26 and 27 may include two plated layers and a conductive resin layer between these plated layers.

Contacting, for example, a metal piece or a metal lead member with the anode terminals 26 and 27 to connect them by laser welding, resistance welding, or ultrasonic welding would generate defect due to mechanical damage and contact fluctuation, and thus is not preferable.

An electric insulating member 43 made of electrical insulation resin is disposed between the cathode-side functional layer 36 and each of the anode terminals 26 and 27. With this configuration, electric insulation can be reliably achieved between the cathode-side functional layer 36 and the anode terminals 26 and 27. In the present embodiment, the porous portion 33 is removed at both end parts of the through conductor 31 to expose the core portion 32, and then the electric insulating member 43 is provided in contact with the core portion 32. Accordingly, the porous portion 33 does not exist in the electric insulating member 43.

Figure 6:
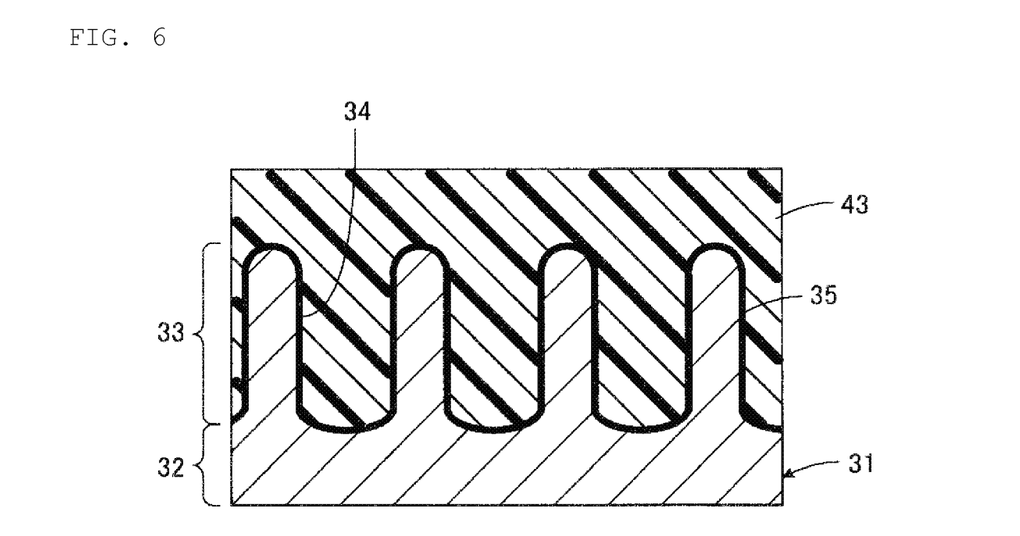
FIG. 6 is an enlarged cross-sectional view schematically illustrating part VI illustrated in FIG. 2 for description of a second embodiment of the present invention.

According to a second embodiment of the present invention, as illustrated in FIG. 6, the electric insulating member 43 may be provided to fill the fine pores 34 of the porous portion 33 at a part where the electric insulating member 43 is in contact with the core portion 32. Accordingly, the porous portion 33 exists in the electric insulating member 43.

In any of the two above-described cases, the electric insulating member 43 is in contact with the core portion 32. This configuration can reduce the occurrence where a plating solution penetrates into the porous portion 33 and remains therein when, for example, wet plating is applied to form the anode terminals 26 and 27.

The sealing member 29 contains resin. The sealing member 29 may contain a filler such as alumina or silica, or a magnetic material in addition to the resin. The mechanical strength and workability of the sealing member 29 can be adjusted through this filler contained in the sealing member 29. In addition, the thermal contraction property of the sealing member 29 can be adjusted by selecting a filler having a desired linear expansion coefficient. The impedance of the capacitor can be intentionally increased through the magnetic material contained in the sealing member 29. For example, when a plurality of capacitors each having a low impedance are mounted and used in parallel, antiresonance potentially occurs. In such a case, the antiresonance can be suppressed through the magnetic material contained in the sealing member. The magnetic material is magnetic powder such as iron powder, powder of an alloy containing iron, or ferrite powder. The magnetic material may be a composite of two or more kinds of powder with different particle sizes or different compositions. In this manner, it is preferable to select desired filler and magnetic material in accordance with a requested functionality.

In the solid electrolytic capacitor 21 described above, the pair of anode terminals 26 and 27 are disposed on the pair of end faces 22 and 23 of the body 25, and both end faces of the core portion 32 of the through conductor 31 are in contact with the pair of anode terminals 26 and 27, respectively, and thus the lengths of conductive paths near the anode terminals 26 and 27 can be shortened. This leads to reduction in parasitic inductance corresponding to parasitic inductances L2 and L3 generated on conductive paths near anode terminals 4 and 5 in an equivalent circuit illustrated in FIG. 9, thereby improving noise removal performance of the solid electrolytic capacitor 21 at a high frequency band ($\omega L$).

The anode terminals 26 and 27, which do not contribute to capacitance formation, are disposed on the end faces 22 and 23 of the body 25, and the end faces of the core portion 32 of the through conductor 31 are directly in contact with the anode terminals 26 and 27, and thus a member that does not contribute to capacitance formation occupies a relatively small fraction of the entire volume, leading to a high volumetric efficiency. This configuration is thus suitable for achieving size reduction and large capacitance. Accordingly, high noise removal performance can be achieved in a frequency band ($1/\omega C$) attributable to capacitance.

As described above, the solid electrolytic capacitor 21 can achieve high noise removal performance in a wide frequency band including a high frequency band attributable to inductance and a frequency band attributable to capacitance.

Since both end faces of the core portion 32 of the through conductor 31 are in planar contact with the pair of anode terminals 26 and 27, respectively, on relatively large areas, this configuration can maintain, at a low value, resistance at electrically connected parts between the core portion 32 of the through conductor 31 and the anode terminals 26 and 27, in other words, resistance corresponding to resistances R1 and R2 illustrated in FIG. 9. Accordingly, large current is allowed to flow through the solid electrolytic capacitor 21.

Since, unlike a cathode terminal 10 illustrated in FIG. 8, the cathode terminal 28 is not formed by bending a metal plate, parasitic inductance corresponding to parasitic inductance L4 in FIG. 9 generated on a conductive path near the cathode terminal 28 can be reduced.

The solid electrolytic capacitor 21 described above is manufactured as described below, for example.

A cylindrical aluminum wire having, for example, a diameter of 0.8 mm and a length of 2.0 mm is prepared as the through conductor 31, the cylindrical aluminum wire including the dielectric layer 35 formed through anode oxidation and the porous portion 33 formed through etching processing. As an example, voltage resistance of the dielectric layer 35 formed in the through conductor 31 was measured to be 60 V when subjected to energization with constant current of 0.35 mA/cm$^2$ in an adipic acid ammonium solution at room temperature for 180 seconds. In this through conductor 31, the porous portion 33 has a thickness of, for example, 0.05 mm.

The through conductor 31 has a section diameter of 0.8 mm with the core portion 32 having a diameter of 0.7 mm and the porous portion 33 having a diameter equal to the rest of the section diameter. The diameter ratio of the core portion 32 relative to the porous portion 33 is thus 0.7/0.1=7.0.

Subsequently, the electric insulating member 43 having, for example, a thickness of 0.05 mm is formed by applying and drying electrically insulating resin around both end parts of the through conductor 31 made of the above-described aluminum wire. The electric insulating member 43 is filling the fine pores 34 of the porous portion 33. The porous portion 33 may be removed before the application of the electrically insulating resin.

Subsequently, the conductive polymer layer 37 as solid electrolyte is formed at a part other than a part on the peripheral surface of the through conductor 31, at which the electric insulating member 43 is disposed, and then, the carbon layer 38 and the silver layer 39 are formed as cathodes. The conductive polymer layer 37 can be formed by chemical oxidation polymerization in which a monomer as a polymer precursor and a reaction solution containing a dopant and an oxidant are alternately applied and subjected to a polymerization reaction, electropolymerization in which an electrochemical polymerization reaction is performed in a reaction solution, or a method of performing polymerization reaction by applying a solution in which a conductive polymer for which conductivity is present in advance is dissolved or dispersed in an optional solvent.

As an example, in order to form the cathode-side functional layer 36, the conductive polymer layer 37 was formed by applying and drying a conductive polymer solution in which poly (3,4-ethylenedioxythiophene) is dispersed as a solid electrolyte while penetrating the conductive polymer solution into the porous portion 33, and then, the carbon layer 38 and the silver layer 39 were sequentially formed by applying and drying silver paste after applying and drying carbon paste. The conductive polymer layer 37 had a thickness of, for example, 0.01 mm on the porous portion 33, and the carbon layer 38 and the silver layer 39 had thicknesses of, for example, 0.01 mm, respectively.

The capacitor element 30 obtained in this manner was measured to have capacitance of 1.0 µF at 120 Hz by using an LCR meter. Then, the capacitor element 30 was measured to have a leakage current of 2.1 nA through application of a voltage of 25 V for one minute. The leakage current was extremely small and excellent (equivalent to 0.0001 CV approximately).

In the above-described process, since the through conductor 31 is cylindrical, formability of the conductive polymer layer 37, the carbon layer 38 and the silver layer 39 is excellent. The entire circumferential surface of the cylindrical through conductor 31 can be used as a capacitance developing part.

Subsequently, the sealing member 29 is formed by bonding the cathode-side functional layer 36 on the through conductor 31 to a metal plate to be formed as the cathode terminal 28 having, for example, a thickness of 0.1 mm and a width of 1.2 mm through the conductive adhesive agent 40, and then shaping resin to expose an outward surface of the cathode terminal 28 and both end faces of the through conductor 31. The exposure of both end faces of the through conductor 31 is preferably achieved by cutting with a dicing machine rather than by polishing. This is because a more uniform exposed surface can be obtained by the cutting, and thus favorable contact can be obtained in formation of the anode terminals 26 and 27.

At the shaping of the sealing member 29, since the through conductor 31 is cylindrical, external stress applied to the through conductor 31 is advantageously distributed to avoid damage on the through conductor 31. Damage causes a failure such as increase in the leakage current. In addition, since the through conductor 31 is cylindrical, the sealing member 29 has an excellent filling characteristic, and thus, for example, no gap is likely to occur between the capacitor element 30 and the sealing member 29, thereby achieving a high package effect by the sealing member 29.

Subsequently, the anode terminals 26 and 27 are formed to be connected with both end faces of the through conductor 31 exposed from the sealing member 29. In order to form the anode terminals 26 and 27, for example, a plated film is formed, and then, a conductive resin film is formed to have, for example, a thickness of 0.01 mm. Alternatively, only a plated film or a conductive resin film is formed in some cases to form the anode terminals 26 and 27.

In this manner, the solid electrolytic capacitor 21 having an outer dimension of, for example, 2.02 mm (longitudinal dimension)×1.22 mm (width dimension)×1.22 mm (height dimension) is formed. As an example, the solid electrolytic capacitor 21 obtained in this manner was measured to have capacitance of 1.0 µF at 120 Hz by using an LCR meter. Then, this capacitor was measured to have a leakage current of 2.0 nA through application of a voltage of 25 V for one minute. No increase in the leakage current was observed, which is desirable.

Figure 7:
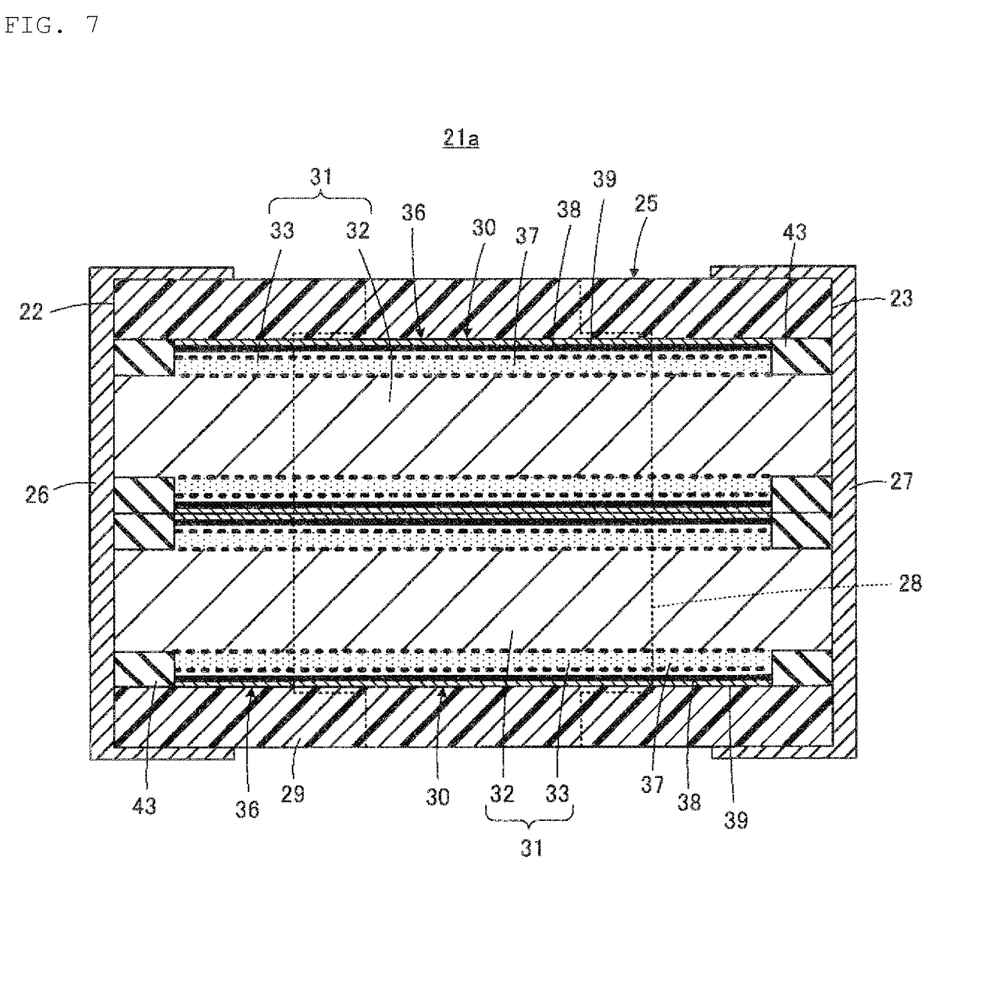
FIG. 7 is a transverse sectional view taken along a central line in a front view illustrating a solid electrolytic capacitor 21a according to a third embodiment of the present invention.

The following describes a solid electrolytic capacitor 21a according to a third embodiment of the present invention with reference to FIG. 7. FIG. 7 is a transverse sectional view taken along a central line in a front view, in which any component corresponding to that illustrated in FIG. 2 is denoted by the same reference sign, and any duplicate description thereof will not be repeated.

In the solid electrolytic capacitor 21a illustrated in FIG. 7, the body 25 includes a plurality of, for example, two of the capacitor elements 30. The two capacitor elements 30 are arranged side by side and covered by the sealing member 29.

The anode terminals 26 and 27 are formed on the end faces 22 and 23 of the body 25 to electrically connect the core portions 32 of the through conductors 31 of the respective two capacitor elements 30 with each other.

The cathode terminal 28, which is illustrated with a dotted line in FIG. 7, is provided along the bottom surface of the body 25 to electrically connect the silver layers 39 included in the cathode-side functional layers 36 of the respective two capacitor elements 30 with each other.

In this manner, the two capacitor elements 30 are connected in parallel with each other through the anode terminals 26 and 27 and the cathode terminal 28. Accordingly, the solid electrolytic capacitor 21a can achieve a lower ESR and a larger capacitance than those of the solid electrolytic capacitor 21 described above.

The present invention is described above with reference to the embodiments illustrated in the drawings, but these embodiments are merely exemplary, and partial exchange or combination of components is possible between the embodiments.

What is claimed is:

1. A solid electrolytic capacitor comprising:
   a capacitor element including:
      a linear through conductor made of a valve function metal and having a cylindrical shape, the through conductor including a core portion extending in an axial direction of the through conductor and having a pair of end faces facing each other, and a porous portion covering a peripheral surface of the core portion,
      a dielectric layer disposed along a surface of the porous portion, and
      a cathode-side functional layer disposed on the dielectric layer,
   a pair of flat-shaped anode terminals respectively disposed on and covering the pair of end faces of the core portion;
   a cathode terminal electrically connected to the cathode-side functional layer; and
   an electric insulating member disposed between the cathode-side functional layer and each of the pair of anode terminals, the electric insulating member extending to and terminating at each of the pair of end faces of the core portion, and the electric insulating member being in direct contact with the pair of flat-shaped anode terminals.

2. The solid electrolytic capacitor according to claim 1, wherein the cathode-side functional layer includes a conductive polymer layer filling at least part of pores of the porous portion.

3. The solid electrolytic capacitor according to claim 1, wherein the electric insulating member is in contact with the core portion.

4. The solid electrolytic capacitor according to claim 3, wherein the electric insulating member fills pores of the porous portion at a part thereof where the electric insulating member is in contact with the core portion.

5. The solid electrolytic capacitor according to claim 3, wherein the porous portion does not contact the pair of anode terminals.

6. The solid electrolytic capacitor according to claim 1, wherein the anode terminal includes a plated film.

7. The solid electrolytic capacitor according to claim 1, wherein the anode terminal includes a conductive resin film.

8. The solid electrolytic capacitor according to claim 1, wherein the porous portion is an etched portion on the peripheral surface of the linear through conductor.

9. The solid electrolytic capacitor according to claim 1, wherein the body includes a plurality of the capacitor elements connected in parallel with each other through the pair of anode terminals and the cathode terminal.

10. The solid electrolytic capacitor according to claim 1, wherein the cathode terminal is a metal plate.

11. The solid electrolytic capacitor according to claim 1, further comprising a sealing member containing resin which covers the capacitor element.

12. The solid electrolytic capacitor according to claim 1, wherein the sealing member further contains a magnetic material.

13. The solid electrolytic capacitor according to claim 1, wherein the cathode terminal is exposed from the sealing member.

14. The solid electrolytic capacitor according to claim 1, wherein the valve function metal is selected from aluminum, tantalum, niobium, titanium, or an alloy thereof.

15. A solid electrolytic capacitor comprising:
a body including a pair of end faces facing to each other and a bottom surface adjacent to the end faces;
a pair of flat shaped anode terminals disposed on the pair of end faces of the body; and
a cathode terminal disposed on the bottom surface of the body,
the body including:
a sealing member containing resin, and
a capacitor element covered by the sealing member,
the capacitor element including:
a linear through conductor having a cylindrical shape and made of a valve function metal,
a dielectric layer disposed on the through conductor, and
a cathode-side functional layer disposed on the dielectric layer and electrically connected with the cathode terminal,
the through conductor including a core portion extending in an axial direction of the through conductor, and a porous portion covering a peripheral surface of the core portion and including a large number of fine pores,
the dielectric layer being formed along an inner peripheral surface of each of the fine pores of the porous portion, and
both end faces of the core portion of the through conductor being exposed from the sealing member and in contact with and covered by the pair of anode terminals on the pair of end faces of the body, respectively; and
an electric insulating member disposed between the cathode-side functional layer and each of the pair of anode terminals, the electric insulating member extending to and terminating at each of the pair of end faces of the core portion, and the electric insulating member being in direct contact with the pair of flat-shaped anode terminals.

* * * * *